United States Patent Office 3,654,277
Patented Apr. 4, 1972

3,654,277
1 - [PHENYLALKYL-CYCLOALKYLOXYALKYL]-
PIPERAZINYL-4-ACETIC ACID-ANILIDE COMPOUNDS AND THERAPEUTIC COMPOSITIONS
Werner Winter and Max Thiel, Mannheim, Kurt Stach, Wolfgang Schaumann, and Karl Dietmann, Mannheim-Waldhof, and Wolfgang Juhran, Mannheim, Germany, assignors to Boehringer Mannheim GmbH, Mannheim, Postfach, Germany
No Drawing. Filed Sept. 15, 1969, Ser. No. 858,168
Claims priority, application Germany, Sept. 19, 1968, P 17 95 362.7
Int. Cl. C07d 51/70
U.S. Cl. 260—268 R  8 Claims

ABSTRACT OF THE DISCLOSURE

Basic ethers having the formula

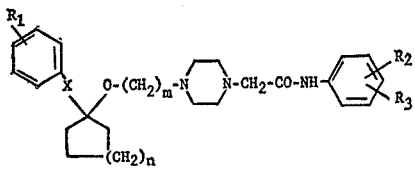

wherein $R_1$, $R_2$ and $R_3$ each represent hydrogen, halogen, lower alkyl, alkoxy or trifluoromethyl, X is a valency bond or a methylene group, $n$ is a whole number of from 1 to 8 and $m$ is 2 or 3, and their pharmaceutically acceptable salts, having cardiovascular activity.

---

This invention relates to basic ethers, to salts thereof, and to processes for preparing and using such compounds.

More particularly, this invention relates to compounds having the following formula:

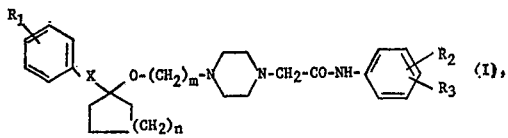

wherein $R_1$, $R_2$ and $R_3$, which may be the same or different, represent hydrogen, halogen, lower alkyl, alkoxy or trifluoromethyl, X represents a valency bond or a methylene group, $n$ is a whole number of from 1 to 8 and $m$ is 2 or 3; and the pharmaceutically acceptable acid addition salts thereof.

In German Pat. No. 1,209,567, there are disclosed structurally similar basic ethers which can be used in psychiatric pharmacotherapy as useful medicaments. These known compounds have only a slight effect if any on the circulation.

In accordance with the invention, it has surprisingly been found that the new basic ethers (I) are characterized by an unexpected cardiovascular activity being highly effective coronary dilating agents.

The new compounds according to the present invention can be prepared, for example by one of the following methods:

(a) Reaction of a basic ether of the formula:

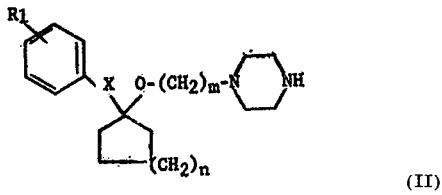

wherein $R_1$, X, $n$ and $m$ have the same meanings as set out above, with a haloacetanilide of the formula:

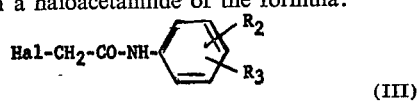

wherein $R_2$ and $R_3$ have the same meanings as given above and Hal is halogen; or (b) reaction of a piperazine derivative of the formula:

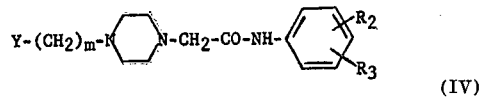

wherein Y is a reactive ester group and $R_2$, $R_3$ and $m$ have the same meanings as given above, with a compound of the formula:

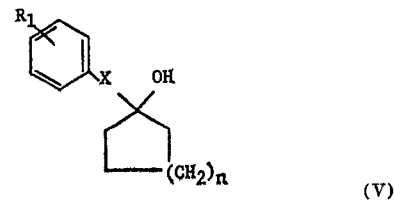

wherein $R_1$, X and $n$ have the same meanings as given above; or (c) reaction of a reactive acid derivative of the formula:

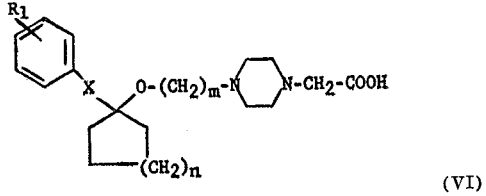

wherein $R_1$, X, $n$ and $m$ have the same meanings as given above, with an aniline derivative of the formula:

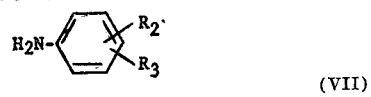

wherein $R_2$ and $R_3$ have the same meanings as set out above. The resulting therapeutically valuable basic ethers may, if desired, be converted into their salts with pharmacologically compatible acids.

As piperazine derivatives (IV) having a reactive ester group Y, it is particularly preferred to use the halides although, in principle, it is also possible to use reactive sulfonic acid esters, for example, tosylates, mesylates or brosylates.

The compounds (V) can be used either directly or in the form of their activated derivatives, for example, as alcoholates. The alcoholates are obtained by the reaction of the free tertiary alcohols with alkali metals or with the strongly basic compounds thereof, such as alkali metal aryls, alkali metal alkyls or alkali metal amides. Other activated derivatives are obtained by the metallization of the tertiary alcohol group by means of Grignard reagents.

Preferred reactive acid derivatives (VI) include, in particular, acid halides, esters, imidazolides and the like.

The piperazine derivatives (IV) used as starting materials can be obtained, for example, by the reaction of N-benzyl-piperazine with a haloacetanilide (III), hydrogenolysis of the benzyl radical, followed by N-alkylation with a bivalent alkylation agent of the formula:

$$Y-(CH_2)_m-Y' \quad \text{(VIII)}$$

wherein Y and $m$ have the same meanings as given above and Y' is a reactive ester group which is different from Y.

In order to direct the reaction as completely as possible in the desired direction and also in order to avoid double reaction, it has proved to be advantageous to use those alkylation agents (VIII), the ester group Y' of which has a greater reactivity than that possessed by Y. Thus, for example, tosyl and brosyl groups react substantially more quickly with the secondary amino group of piperazine than the halogen-substituted part of the compound (VIII).

The preparation of the acids (VI) or of their reactive derivatives used as starting materials takes place by the reaction of compounds (II) with chloroacetic acid or with chloroacetic acid esters and possibly subsequent treatment with inorganic acid chlorides.

The pharmaceutically acceptable acid addition salts are obtained in the conventional manner, for example, by neutralization of the free bases (I) with non-toxic inorganic or organic acids, for example, hydrochloric acid, sulfuric acid, phosphoric acid, hydrobromic acid, acetic acid, lactic acid, citric acid, oxalic acid, malic acid, salicylic acid, malonic acid, maleic acid or succinic acid.

The new compounds (I) according to the present invention and the salts thereof can be administered enterally and parenterally in liquid or solid form in admixture with solid or liquid pharmaceutical carriers or diluents. As injection medium, it is preferred to use water which contains the conventional additives, such as stabilizing agents, solubilizing agents, buffers and the like. Additives of this kind include, for example, tartrate and citrate buffers, ethanol, complex-forming agents (such as ethylene-diamine-tetraacetic acid and the non-toxic salts thereof), high molecular weight polymers (such as liquid polyethylene oxide) for the regulation of the viscosity. Solid carrier materials include, for example, starch, lactose, mannitol, methyl cellulose, talc, highly dispersed silicic acid, high molecular weight fatty acids (such as stearic acid), gelatine, agar agar, calcium phosphate, magnesium stearate, animal and vegetable fats, solid high molecular weight polymers (such as polyethylene glycols). Furthermore, compositions intended for oral administration can, if desired, also contain flavoring and sweetening agents.

For a fuller understanding of the nature and objects of the invention, reference may be had to the following example which is given merely as further illustration of the invention and is not to be construed in a limiting sense.

EXAMPLE

1-{1-[1-(4-fluorophenyl)-cyclohexyloxy]-propyl-3}-piperazinyl-4-acetic acid-2-methyl-anilide 6.4 g. (0.02 mol 1-{1-[1-(4-fluorophenyl)-cyclohexyloxy]-propyl-3}-piperazine were heated under reflux for 5 hours in 60 ml. dimethyl formamide (or in 150 ml. tetrahydrofuran), following the addition thereto of 10.1 g. (0.1 mol) triethylamine and 4.01 g. N-chloroacetyl-2-methylanilide. The reaction mixture was thereafter filtered, the filtrate evaporated under vacuum and the residue taken up in ether. There was precipitated out of this solution, by the addition of an etheral solution of maleic acid, the maleate of 1 - {1 - [1 - (4-fluorophenyl)-cyclohexyloxy]-propyl-3}-piperazinyl-4-acetic acid-2-methylanilide. The maleate was again dissolved in methanol and reprecipitated by the addition of ether to the resultant solution. The yield amounted to 10.9 g. (77.5% of theory).

In an analogous manner, there were obtained the compounds which have been set out in the following table:

TABLE I

| Compound | M.P.,° C. | Yield, percent of theory |
|---|---|---|
| 1-{1-[1-(4-chlorophenyl)-cyclohexyloxy]-propyl-3}-piperazinyl-4-acetic acid-2,6-dimethyl-anilide | 236–238 (hydrochloride) | 74 |
| 1-{1-[1-(4-chlorophenyl)-cyclohexyloxy]-propyl-3}-piperazinyl-4-acetic acid-2,4-dimethyl-anilide | 197–198 (hydrochloride) | 81 |
| 1-{1-[1-(4-chlorophenyl)-cyclohexyloxy]-propyl-3}-piperazinyl-4-acetic acid-2,3-dimethyl-anilide | 209–210 (hydrochloride) | 83 |
| 1-{1-[1-(4-chlorophenyl)-cyclohexyloxy]-propyl-3}-piperazinyl-4-acetic acid-3,4-dichloroanilide | 229–230 (hydrochloride) | 76 |
| 1-{1-[1-(4-fluorophenyl)-cyclohexyloxy]-propyl-3}-piperazinyl-4-acetic acid-2,6-dimethyl-anilide | 242–243 (hydrochloride) | 73 |
| 1-{1-[1-(4-fluorophenyl)-cyclohexyloxy]-propyl-3}-piperazinyl-4-acetic acid-2,4-dimethyl-anilide | 187–188 (hydrochloride) | 68 |
| 1-{1-[1-(4-fluorophenyl)-cyclohexyloxy]-propyl-3}-piperazinyl-4-acetic acid-2,3-dimethyl-anilide | 232–233 (hydrochloride) | 71 |
| 1-{1-[1-(4-fluorophenyl)-cyclohexyloxy]-propyl-3}-piperazinyl-4-acetic acid-3,4-dimethyl-anilide | 266–267 (hydrochloride) | 65 |
| 1-{1-[1-(4-fluorophenyl)-cyclohexyloxy]-propyl-3}-piperazinyl-4-acetic acid-3,4-dichloroanilide | 229–230 (hydrochloride) | 78 |
| 1-{1-[1-(3-methyl-phenyl)-cyclohexyloxy]-propyl-3}-piperazinyl-4-acetic acid-2,6-dimethyl-anilide | 235–236 (hydrochloride) | 69 |
| 1-{1-[1-(2-methyl-phenyl)-cyclohexyloxy]-propyl-3}-piperazinyl-4 acetic acid-2,6-dimethyl-anilide | 245–246 (hydrochloride) | 73 |
| 1-{1-[1-(2-methyl-phenyl)-cyclohexyloxy]-propyl-3}-piperazinyl-4-acetic acid-2,4-dimethyl-anilide | 191–192 (hydrochloride) | 80 |
| 1-{1-[1-(4-methyl-phenyl)-cyclohexyloxy]-propyl-3}-piperazinyl-4-acetic acid-2,6-dimethyl-anilide | 247–248 (hydrochloride) | 68 |
| 1-{1-[1-(2-methoxy-phenyl)-cyclohexyloxy]-propyl-3}-piperazinyl-4-acetic acid-2,6-dimethyl-anilide | 246 (hydrochloride) | 78 |
| 1-{1-[1-(2-chlorophenyl)-cyclohexyloxy]-propyl-3}-piperazinyl-4-acetic acid-2,6-dimethyl-anilide | 215–216 (hydrochloride) | 60 |
| 1-{1-[1-(4-chlorophenyl)-cyclohexyloxy]-propyl-3}-piperazinyl-4-acetic acid-2-methyl-6-chloroanilide | 162–163 (maleate) | 59 |
| 1-{1-[1-(4-chlorophenyl)-cyclohexyloxy]-propyl-3}-piperazinyl-4-acetic acid-2-methyl-3-chloroanilide | 167–168 (maleate) | 63 |
| 1-{1-[1-(4-chlorophenyl)-cyclohexyloxy]-propyl-3}-piperazinyl-4-acetic acid-2-methyl-4-chloroanilide | 154–155 (maleate) | 66 |
| 1-{1-[1-(4-chlorophenyl)-cyclohexyloxy]-propyl-3}-piperazinyl-4-acetic acid-4-methyl-3-chloroanilide | 161 (maleate) | 53 |
| 1-{1-[1-(4-chlorophenyl)-cyclohexyloxy]-propyl-3}-piperazinyl-4-acetic acid-2-methyl-5-chloroanilide | 163–164 (maleate) | 64 |
| 1-{1-[1-(4-fluorophenyl)-cyclohexyloxy]-propyl-3}-piperazinyl-4-acetic acid-2,6-dichloroanilide | 162 (maleate) | 79 |
| 1-{1-[1-(4-chlorophenyl)-cyclohexyloxy]-propyl-3}-piperazinyl-4-acetic acid-2,6-dichloroanilide | 161 (maleate) | 75 |
| 1-{1-[1-(3-methyl-phenyl)-cyclohexyloxy]-propyl-3}-piperazinyl-4-acetic acid-2,4-dimethyl-anilide | 134 (maleate) | 83 |
| 1-{1-[1-(4-methyl-phenyl)-cyclohexyloxy]-propyl-3}-piperazinyl-4-acetic acid-2,4-dimethyl-anilide | 152 (maleate) | 73 |
| 1-{1-[1-(2-chlorophenyl)-cyclohexyloxy]-propyl-3}-piperazinyl-4-acetic acid-2,4-dimethyl-anilide | 157 (hydrochloride) | 58 |
| 1-{1-[1-(4-fluorophenyl)-cyclohexyloxy]-propyl-3}-piperazinyl-4-acetic acid-2-methyl-anilide | 162 (maleate) | 77.5 |
| 1-{1-(1-phenyl-cyclohexyloxy)-propyl]-piperazinyl-4-acetic acid-2,6-dimethylanilide | 247–248 (hydrochloride) | 63 |
| 1-{1-(1-phenyl-cyclohexyloxy)-propyl]-piperazinyl-4-acetic acid-2,4-dimethylanilide | 193–194 (hydrochloride) | 68 |
| 1-{1-[1-(4-chlorophenyl)-cycloheptyloxy]-propyl-3}-piperazinyl-4-acetic acid 2,6-dimethyl-anilide | 161 (maleate) | 76 |
| 1-{1 [1-(4-chlorophenyl)-cycloheptyloxy]-propyl-3}-piperazinyl-4-acetic acid-2,4-dimethyl-anilide | 150 (maleate) | 52 |
| 1-{1-[1-(4-chlorophenyl)-cyclopentyloxy]-propyl-3}-piperazinyl-4-acetic acid-2,6-dimethyl-anilide | 163 (maleate) | 81 |
| 1-{1-[1-(4-chlorophenyl)-cyclopentyloxy]-propyl-3}-piperazinyl-4-acetic acid-2,4-dimethyl-anilide | 162 (maleate) | 83 |
| 1-{1-[1-(4-chlorophenyl)-cyclohexyloxy]-ethyl-2}-piperazinyl-4-acetic acid-2,6-dimethyl-anilide | 164 (maleate) | 71 |
| 1-{1-[1-(4-chlorophenyl)-cyclohexyloxy]-ethyl-2}-piperazinyl-4-acetic acid 2,4-dimethyl anilide | 170 (maleate) | 69 |
| 1-{1-[1-(4-chlorophenyl)-cyclododecyloxy]-propyl-3}-piperazinyl-4-acetic acid-2,6-dimethyl-anilide | 169 (maleate) | 65 |
| 1-{1-[1-(4-fluorophenyl)-cyclohexyloxy]-ethyl 2}-piperazinyl-4-acetic acid-2,6-dimethyl-anilide | 168 (maleate) | 76 |
| 1-{1-[1-(4-fluorophenyl)-cyclohexyloxy]-ethyl 2}-piperazinyl-4-acetic acid-2,4-dimethyl-anilide | 173 (maleate) | 68 |
| 1-{1-[1-(4-chlorobenzyl)-cyclohexyloxy]-propyl-3}-piperazinyl-4-acetic acid-2,6-dimethyl-anilide | 236–238 (hydrochloride) | 68 |
| 1-{1-[1-(4-chlorobenzyl)-cyclohexyloxy]-propyl-3}-piperazinyl-4-acetic acid-2,4-dimethyl-anilide | 202–203 (hydrochloride) | 70 |
| 1-{1-[1-(4-fluorobenzyl)-cyclohexyloxy]-propyl-3}-piperazinyl-4-acetic acid-2,6-dimethyl-anilide | 151–152 (maleate) | 63 |
| 1-{1-[1-(4-fluorobenzyl)-cyclohexyloxy]-propyl-3}-piperazinyl-4-acetic acid-2,4-dimethyl-anilide | 132–133 (maleate) | 61 |
| 1-{1-[1-(3-fluorobenzyl)-cyclohexyloxy]-propyl-3}-piperazinyl-4-acetic acid-2,6-dimethyl-anilide | 137–138 (maleate) | 67 |
| 1-{1-[1-(4-fluorophenyl)-cyclohexyloxy]-propyl-3}-piperazinyl-4-acetic acid-2-methyl-6-chloroanilide | 165–166 (maleate) | 75 |
| 1-{1-[1-(2-chlorophenyl)-cyclohexyloxy]-propyl-3}-piperazinyl-4-acetic acid-2,6-dichloroanilide | 156 (maleate) | 72 |
| 1-{1-[1-(4-fluorophenyl)-cyclohexyloxy]-propyl-3}-piperazinyl-4-acetic acid-2-methyl-4-chloroanilide | 152 (maleate) | 75 |
| 1-{1-[1-(4-fluorophenyl)-cyclohexyloxy]-propyl-3}-piperazinyl-4-acetic acid-2-methyl-5-chloroanilide | do | 83 |
| 1-{1-[1-(4-fluorophenyl)-cyclohexyloxy]-propyl-3}-piperazinyl-4-acetic acid-3-chloro 4-methyl-anilide | 162 (maleate) | 76 |
| 1-{1-[1-(4-fluorophenyl)-cyclohexyloxy]-propyl-3}-piperazinyl-4-acetic acid-2-methyl-3-chloroanilide | 193–194 (hydrochloride) | 81 |
| 1-{1-[1-(4-fluorophenyl)-cyclohexyloxy]-propyl-3}-piperazinyl-4-acetic acid-2,3-dichloroanilide | 150 (maleate) | 68 |
| 1-{1-[1-(4-fluorophenyl)-cyclohexyloxy]-propyl-3}-piperazinyl-4-acetic acid-3-trifluoromethyl-anilide | 136–138 (maleate) | 63 |
| 1-{1-[1-(4-fluorophenyl)-cyclohexyloxy]-propyl-3}-piperazinyl-4-acetic acid-2-trifluoromethyl-anilide | 133 (maleate) | 71 |
| 1-{1-[1-(3-trifluoromethyl-phenyl)-cyclohexyloxy]-propyl-3}-piperazinyl-4-acetic acid-2,6-dimethyl-anilide | 159–160 (maleate) | 68 |
| 1-{1-[1-(4-fluorophenyl)-cyclohexyloxy]-propyl-3}-piperazinyl-4-acetic acid-2-methoxy-5-chloroanilide | 140 (maleate) | 65 |
| 1-{1-[1-(4-fluorophenyl)-cyclohexyloxy]-ethyl-2}-piperazinyl-4-acetic acid-2-methyl-6-chloroanilide | 153 (maleate) | 76 |
| 1-{1-[1-(4-fluorophenyl)-cyclohexyloxy)-propyl-3}-piperazinyl-4-acetic acid-2,6-dichloroanilide | 152 (maleate) | 62 |
| 1-{1-[4-fluorobenzyl)-cyclohexyloxy]-propyl-3}-piperazinyl-4-acetic acid-2-chloro-6-methyl-anilide | 154 (maleate) | 67 |
| 1-{1-[1-(4-fluorophenyl)-cyclohexyloxy]-propyl-3}-piperazinyl-4-acetic acid-3-chloro-4-methoxy-anilide | 153 (maleate) | 73 |
| 1-{1-[1-(4-fluorophenyl)-cyclohexyloxy)-ethyl-2}-piperazinyl-4-acetic acid-2,6-dichloroanilide | 156 (maleate) | 78 |
| 1-{1-[1-(3-trifluoromethyl-phenyl)-cyclohexyloxy]-propyl-3}-piperazinyl-4-acetic acid-2,6-dichloroanilide | 157 (maleate) | 75 |

The starting materials corresponding to structural Formula II which were used are set out in the following table:

TABLE 2

| Compound | B.P. ° C./ mm. Hg |
|---|---|
| 1-{1-[1-4-fluorophenyl)-cyclohexyloxy]-propyl-3}-piperazine | 175–178/0.2 |
| 1-{1-[1-(3-methyl-phenyl)-cyclohexyloxy]-propyl-3}-piperazine | 200–205/0.7 |
| 1-{1-[1-(2-methyl-phenyl)-cyclohexyloxy]-propyl-3}-piperazine | 175–180/0.0 |
| 1-{1-[1-(4-methyl-phenyl)-cyclohexyloxy]-propyl-3}-piperazine | 168–172/0.05 |
| 1-{1-[1-(2-methoxy-phenyl)-cyclohexyloxy]-propyl-3}-piperazine | 173–179/0.05 |
| 1-[1-(1-phenyl-cyclohexyloxy)-propyl-3]-piperazine | 163–168/0.1 |
| 1-{1-[1-(2-chlorophenyl)-cyclohexyloxy]-propyl-3}-piperazine | 180–185/0.1 |
| 1-{1-[1-(4-chlorophenyl)-cycloheptyloxy]-propyl-3}-piperazine | 203–206/0.4 |
| 1-{1-[1-(4-chlorophenyl)-cyclopentyloxy]-propyl-3}-piperazine | 280–283/0.3 |
| 1-{1-[1-(4-chlorophenyl)-cyclohexyloxy]-ethyl-2}-piperazine | 176–178/0.1 |
| 1-{1-[1-(4-chlorophenyl)-cyclododecyloxy]-propyl-3}-piperazine | 230–235/0.2 |
| 1-{1-[1-(4-fluorophenyl)-cyclohexyloxy]-ethyl-2}-piperazine | 170–175/0.2 |
| 1-{1-[1-(4-chlorobenzyl)-cyclohexyloxy]-propyl-3}-piperazine | 240–250/0.6 |
| 1-{1-[1-(4-fluorobenzyl)-cyclohexyloxy]-propyl-3}-piperazine | 180–183/0.1 |
| 1-{1-[1-(3-fluorobenzyl)-cyclohexyloxy]-propyl-3}-piperazine | 178–183/0.1 |

In order to establish the effectiveness of the compounds in accordance with the invention as therapeutic agents exerting an effect on the cardiac and circulatory systems, the applicants carried out a series of tests, the details and significance of which are set out hereinafter.

In order to compare the effectiveness of the novel basic ethers on the coronary blood circulation, the applicants have selected [1 - (p-chlorophenyl)-cyclohexyl]-[γ(4-methylpiperazinyl - 1 - propyl]-ether which has been described in U.S. Pat. 3,254,083 as the comparison compound.

An increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen and namely, to an improvement in the oxygen supply to the myocardium which is the ultimate aim sought to be achieved with all coronary dilating agents.

For the purpose of obtaining an exact basis for evaluating the results of the procedures involved, the decrease in coronary arteriovenous oxygen difference (at the time of the maximum effect) has been reported in volume percent in the table as compared to the starting value. The greater the value reported the more significant was the coronary oxygen supply increase.

The procedures were carried out using 30 alert unanesthetized dogs, each weighing between 14 and 22 kg. The procedure of Rayford, Huvos and Gregg, Proc. Soc. exp. Biol. Med. 113, 876 [1963] was followed, catheters having been implanted surgically into the Sinus coronarius, the aorta and the vena cava of the animals. It was thus made possible to photometrically determine the coronary arteriovenous saturation difference (Brinkman, Arch. Chir. Neerl. 1, 177 [1949]) and from the actual hemoglobin values obtained to convert the values into the corresponding volume percents. The compounds were administered intravenously in the amounts indicated in 1 ml. of a 5% Lutrol-9-solution (liquid polyethylene oxide, molecular weight about 400, Basf-Ludwigshafen) in 5.5, percent aqueous glucose.

The following compounds were employed in the experimental procedures:

(A) [1-(p-chlorophenyl)-cyclohexyl]-[γ-(4-methyl-piperazinyl-1)-propyl]-ether U.S. Patent 3,254,083
(B) 1-{1-[1-(4-chlorophenyl)-cyclohexyloxy]-propyl-3}-piperazinyl-4-acetic acid-2,6-dimethyl-anilide
(C) 1-{1-[1-(4-chlorophenyl)-cyclohexyloxy]-propyl-3}-piperazinyl-4-acetic acid-2,4-dimethyl-anilide
(D) 1-{1-[1-(4-chlorophenyl)-cyclohexyloxy]-propyl-3}-piperazinyl-4-acetic acid-3,4-dichloro-anilide
(E) 1-{1-[1-(4-fluorophenyl)-cyclohexyloxy]-propyl-3-}-piperazinyl-4-acetic acid-2,6-dimethyl-anilide
(F) 1-{1-[1-(4-fluorophenyl)-cyclohexyloxy]-propyl-3}-piperazinyl-4-acetic acid-3,4-dichloro-anilide
(G) 1-{1-[1-(4-fluorophenyl)-cyclohexyloxy]-propyl-3}-piperazinyl-4-acetic acid-2,4-dimethyl-anilide
(H) 1-{1-[1-(4-fluorophenyl)-cyclohexyloxy]-propyl-3}-piperazinyl-4-acetic acid-3,4-dimethyl-anilide
(I) 1-{1-[1-(4-chlorobenzyl)-cyclohexyloxy]-propyl-3}-piperazinyl-4-acetic acid-2,6-dimethyl-anilide
(J) 1-{1-[1-(4-chlorobenzyl)-cyclohexyloxy]-propyl-3}-piperazinyl-4-acetic acid-2,4-dimethyl-anilide
(K) 1-{1-[1-(2-methylphenyl)-cyclohexyloxy]-propyl-3}-piperazinyl-4-acetic acid-2,6-dimethyl-anilide
(L) 1-{1-[1-(4-methylphenyl)-cyclohexyloxy]-propyl-3}-piperazinyl-4-acetic acid-2,6-dimethyl-anilide
(M) 1-{1-[1-(2-methoxyphenyl)-cyclohexyloxy]-propyl-3}-piperazinyl-4-acetic acid-2,6-dimethyl-anilide
(N) 1-[1-(1-phenyl-cyclohexyloxy)-propyl]-piperazinyl-4-acetic acid-2,4-dimethyl-anilide
(O) 1-{1-[1-(4-chlorophenyl)-cycloheptyloxy]-propyl-3}-piperazinyl-4-acetic acid-2,6-dimethyl-anilide
(P) 1-{1-[1-(4-chlorophenyl)-cycloheptyloxy]-propyl-3}-piperazinyl-4-acetic acid-2,4-dimethyl-anilide
(Q) 1-{1-[1-(4-chlorophenyl-cyclopentyloxy]-propyl-3}-piperazinyl-4-acetic acid-2,4-dimethyl-anilide
(R) 1-{1-[1-(4-chlorophenyl)-cyclopentyloxy]-propyl-3}-piperazinyl-4-acetic acid-2,6-dimethyl-anilide
(S) 1-{1-[1-(4-chlorophenyl)-cyclohexyloxy]-propyl-3}-piperazinyl-4-acetic acid-2-methyl-6-chloro-anilide
(T) 1-{1-[1-(4-chlorophenyl)-cyclohexyloxy]-propyl-3}-piperazinyl-4-acetic acid-2-methyl-3-chloro-anilide
(U) 1-{1-[1-(4-chlorophenyl)-cyclohexyloxy]-propyl-3}-piperazinyl-4-acetic acid-4-methyl-3-chloro-anilide
(V) 1-{1-[1-(4-chlorophenyl)-cyclohexyloxy]-propyl-3}-piperazinyl-4-acetic acid-2-methyl-5-chloro-anilide
(W) 1-{1-[1-(4-fluorophenyl)-cyclohexyloxy]-propyl-3}-piperazinyl-4-acetic acid-2,6-dichloro-anilide
(X) 1-{1[1-(4-chlorophenyl)-cyclohexyloxy]-propyl-3}-piperazinyl-4-acetic acid-2,6-dichloro-anilide
(Y) 1-{1-[1-(4-chlorophenyl)-cyclohexyloxy]-ethyl-2}-piperazinyl-4-acetic acid-2,4-dimethyl-anilide
(Z) 1-{1-[1-(4-fluorophenyl)-cyclohexyloxy]-propyl-3}-piperazinyl-4-acetic acid-2-methyl-anilide
(AA) 1-{1-[1-(4-fluorophenyl)-cyclohexyloxy]-propyl-3}-piperazinyl-4-acetic acid-2-methyl-6-chloro-anilide
(BB) 1-{1-[1-(2-chlorophenyl)-cyclohexyloxy]-propyl-3}-piperazinyl-4-acetic acid-2,6-dichloro-anilide
(CC) 1-{1-[1-(4-fluorophenyl)-cyclohexyloxy]-propyl-3}-piperazinyl-4-acetic acid-2-methyl-4-chloro-anilide
(DD) 1-{1-[1-(4-fluorophenyl)-cyclohexyloxy]-propyl-3}-piperazinyl-4-acetic acid-2-methyl-5-chloro-anilide
(EE) 1-{1-[1-(4-fluorophenyl)-cyclohexyloxy]-propyl-3}-piperazinyl-4-acetic acid-3-chloro-4-methyl-anilide
(FF) 1-{1-[1-(4-fluorophenyl)-cyclohexyloxy]-propyl-3}-piperazinyl-4-acetic acid-2,3-dichloro-anilide The above products in each case were applicated in the form of their salts.

The results of the experimental procedures are set out in the following table:

TABLE 3.—IMPROVEMENT OF THE CORONARY $O_2$ SUPPLY MEASURED FROM THE a.v. $DO_2$ DIFFERENCE

| Substance | Dosage, mg./kg., i.v. | Dosage of the coronary $O_2$ supply in vol. percent[1] |
|---|---|---|
| A | 5 | 0.4 |
| B | 5 | 2.7 |
| C | 5 | 2.5 |
| D | 5 | 6.7 |
| E | 5 | 5.0 |
| F | 5 | 1.4 |
| G | 5 | 1.6 |
| H | 5 | 1.5 |
| I | 5 | 2.0 |
| J | 5 | 1.0 |
| K | 5 | 5.8 |
| L | 5 | 1.3 |
| M | 5 | 1.0 |
| N | 5 | 1.7 |
| O | 5 | 1.3 |
| P | 5 | 1.2 |
| Q | 5 | 1.1 |
| R | 5 | 6.6 |
| S | 5 | 1.5 |
| T | 5 | 1.9 |
| U | 5 | 2.8 |
| V | 5 | 1.0 |
| W | 5 | 6.6 |
| X | 5 | 1.6 |
| Y | 5 | 1.6 |
| Z | 5 | 1.5 |
| AA | 5 | 7.9 |
| BB | 5 | 1.9 |
| CC | 5 | 1.3 |
| DD | 5 | 1.3 |
| EE | 5 | 5.0 |
| FF | 5 | 2.2 |

[1] Compared to the controls at maximum effect.

From the above table, it can be seen that the compounds in accordance with the invention constitute highly valuable therapeutic agents having marked coronary dilating properties in contrast to the known compound which is substantially ineffective in a dosage range of 5 mg./kg. in the dog as a coronary dilating agent.

As the comparison compound at the dosage indicated already produced a central stimulating effect, the said effect being totally absent from the compounds of the invention, the comparison compound could not be used at this dosage or at any increased value for the instant purpose. This effect as noted is not associated with the compounds of the invention so that they are eminently suitable as medicaments for producing a coronary dilation.

In dosage unit form, the compounds as set out herein are used in amounts of from 0.1–50 mg., preferably 0.5–10 mg., active ingredient per dosage unit. Preferably, the compositions are compounded so that for parenteral administration, 0.5–5 mg. of active compound/dosage unit is present and for oral administration 2–10 mg. of compound/dosage unit.

What is claimed is:
1. A basic ether compound selected from the group consisting of a basic ether corresponding to the formula

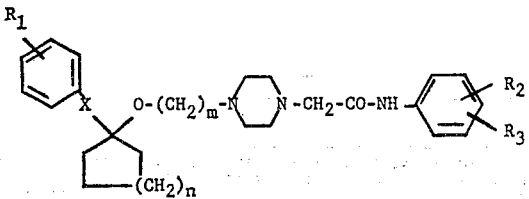

and a pharmaceutically acceptable acid addition salt of said basic ether, wherein $R_1$, $R_2$, $R_3$ each represent a member selected from the group consisting of hydrogen, halogen, lower alkyl, lower alkoxy and trifluoromethyl, X is a valency bond or a methylene group, $n$ is a whole number of from 1 to 4, and $m$ is 2 or 3.

2. A compound according to claim 1 designated 1-{1-[1 - (4-chlorophenyl)-cyclohexyloxy]-propyl-3}-piperazinyl-4-acetic acid-3,4-dichloro-anilide.

3. A compound according to claim 1 designated 1-{1-[1-(4 - fluorophenyl)-cyclohexyloxy]-propyl - 3}-piperazinyl-4-acetic acid-2,6-dimethyl-anilide.

4. A compound according to claim 1 designated 1-{1-[1-(2 - methylphenyl)-cyclohexyloxy]-propyl - 3}-piperazinyl-4-acetic acid-2,6-dimethyl-anilide.

5. A compound according to claim 1 designated 1-{1-[1-(4 - chlorophenyl)-cyclopentyloxy]-propyl - 3}-piperazinyl-4-acetic acid-2,6-dimethyl-anilide.

6. A compound according to claim 1 designated 1-{1-[1-(4-fluorophenyl)-cyclohexyloxy]-propyl - 3}-piperazinyl-4-acetic acid-2,6-dichloro-anilide.

7. A compound according to claim 1 designated 1-{1-[1 - (4 - fluorophenyl)-cyclohexyloxy]-propyl - 3}piperazinyl-4-acetic acid-2-methyl-6-chloro-anilide.

8. A compound according to claim 1 designated 1-{1-[1 - (4 - fluorophenyl)-cyclohexyloxy]-propyl - 3}-piperazinyl-4-acetic acid-3-chloro-4-methyl-anilide.

References Cited
UNITED STATES PATENTS 3,254,083    5/1966    Stach et al. _____ 260—268 R

FOREIGN PATENTS 3,241M    4/1965    France _____ 260—268
1,209,567    1/1966    Germany _____ 260—268

DONALD G. DAUS, Primary Examiner

U.S. Cl. X.R.

260—562 R, 562 B, 562 A, 578; 424—250

UNITED STATES PATENT OFFICE
CERTIFICATE OF CORRECTION

Patent No. 3,654,277　　　　　　　　　　Dated April 4, 1972

Inventor(s) Werner Winter et al

It is certified that error appears in the above-identified patent and that said Letters Patent are hereby corrected as shown below:

Column 4, line 15

"(0.02 Mol " should read　　-- (0.02 Mol) --

Column 5, line 13

"175-180/0.0" should read　　-- 175-180/0.05 --

Column 7, line 5 - 6, Table 3

"Dosage" should read　　-- Decrease --

Signed and sealed this 19th day of September 1972.

(SEAL)
Attest:

EDWARD M. FLETCHER, JR.　　　　ROBERT GOTTSCHALK
Attesting Officer　　　　　　　　Commissioner of Patents